United States Patent
Malpass et al.

(10) Patent No.: US 6,866,916 B1
(45) Date of Patent: Mar. 15, 2005

(54) SLIP RESISTANT MAT AND PROCESS OF MANUFACTURE OF SAME

(75) Inventors: Ian S. Malpass, Alpharatta, GA (US); Jeffrey L. Cofer, Conyers, GA (US)

(73) Assignee: Millennium Mat Co., Suwanee, GA (US)

( * ) Notice: Subject to any disclaimer, the term of this patent is extended or adjusted under 35 U.S.C. 154(b) by 171 days.

(21) Appl. No.: 09/717,553

(22) Filed: Nov. 21, 2000

(51) Int. Cl.[7] .............................. B32B 3/00; A47G 9/06; B28B 5/00; B29C 63/00
(52) U.S. Cl. ........................ 428/172; 428/95; 428/212; 428/217; 5/417; 156/242; 264/241
(58) Field of Search .................... 428/95, 156, 172, 428/212, 217; 5/417; 52/177; 15/215; 156/242; 264/241, 257, 319

(56) References Cited

U.S. PATENT DOCUMENTS

| | | |
|---|---|---|
| 1,613,158 A | 1/1927 | Brewer |
| 2,081,992 A | 6/1937 | Gavlak |
| 2,217,821 A * | 10/1940 | Shiner ........................... 5/417 |
| 2,466,502 A | 4/1949 | Stiller |
| 2,512,310 A * | 6/1950 | Corson ........................... 5/417 |
| 2,681,865 A * | 6/1954 | Heine ............................. 117/8 |
| 3,251,076 A | 5/1966 | Burke |
| 3,418,668 A | 12/1968 | Anderson et al. |
| D238,538 S | 1/1976 | Smith |
| 4,010,302 A * | 3/1977 | Anderson et al. .............. 428/95 |
| 4,361,614 A | 11/1982 | Moffitt, Jr. |
| 4,528,231 A | 7/1985 | Lund |
| 4,557,475 A | 12/1985 | Donovan |
| 4,622,260 A * | 11/1986 | Tesch .......................... 428/173 |
| 4,637,942 A * | 1/1987 | Tomarin ....................... 428/17 |
| 5,198,278 A * | 3/1993 | Sumimoto et al. |
| 5,305,565 A | 4/1994 | Nagahama |
| 5,456,966 A | 10/1995 | Austin |
| 5,482,754 A | 1/1996 | Crook |
| 5,613,332 A | 3/1997 | Saylor, Jr. |
| 5,778,609 A | 7/1998 | Pawson |
| 5,815,995 A | 10/1998 | Adam |
| 5,882,764 A | 3/1999 | Kessler |
| 5,958,538 A | 9/1999 | Kessler |
| 6,014,779 A | 1/2000 | Lindholm |
| 6,042,915 A | 3/2000 | Kessler |
| 6,068,908 A | 5/2000 | Kessler |
| 6,120,872 A | 9/2000 | Deshon |
| 6,132,846 A * | 10/2000 | Wang et al. ................. 428/156 |
| 2002/0114926 A1 * | 8/2002 | Malpass et al. .............. 428/156 |

* cited by examiner

*Primary Examiner*—Donald J. Loney
(74) *Attorney, Agent, or Firm*—King & Spalding LLP

(57) ABSTRACT

A slip resistant floor mat composed of one or more layers of material the bottom layer of which incorporates a plurality of recessions in the bottom surface of the bottom layer that comes into intended surface, such as a floor. The mat may be manufactured by using a press mold to form recessions on the bottom surface of the bottom layer of the mat, and if desired, additional layers may be laminated together with the bottom layer.

16 Claims, 6 Drawing Sheets

SLIP RESISTANT MAT AND PROCESS OF MANUFACTURE OF SAME

FIELD OF INVENTION

This invention relates generally to slip resistant, anti-skid or anti-creep mats.

BACKGROUND OF THE INVENTION

In the past, dust floor mats, consisting of rubber backed carpet tuft, were made with either a smooth back, primarily for solid or non carpeted floors, or with a variety of "grippers" or "cleats" arranged to reduce the movement on carpeted floors. However, both of these approaches resulted in floor mats that were not skid resistant on smooth floors, especially those floors with high traffic areas or loads being moved over them. The movement of in the gripper/cleat mat design results from the force of foot and vehicle traffic on the mat which causes deformation around the compressed area and upon removal of such force the mat returns to a different position. For the smooth back mats, movement of the mat results from similar forces and the lack of any device intended to secure the mat in place.

A number of approaches have been taken to attempt to reduce the movement of mats. One known approach to the problem is to fasten the mat to the intended surface by various devices, such as that suggested by Kessler in U.S. Pat. No. 6,068,908 which utilizes a system by which a mat is fastened to the surface using a clip system. While this approach is well-developed, it results in floor mats that are difficult or impossible to move from place to place and the structures required to attach the mat add a measure of expense to the mat and difficulty to the installation. Also, attached mats are more rigid.

Another approach involves the use of a frame into which the mat is placed, such as the frames used by Moffitt, Jr. in U.S. Pat. No. 4,361,614 and Kessler in U.S. Pat. No. 6,042,915. The frame can be located flush with or upon the surface. In either circumstance, unless the frame is fastened as mentioned above or embedded in the surface, the frame still has a tendency to shift on the surface. If the frame is fastened or embedded, then the problems mentioned above remain.

Another approach involves the use of suction cups, such as those commonly found on shower and bath mats, examples of which can be found by Lindholm in U.S. Pat. No. 6,014,779 in which the corners of a rectangular mat are held by four suction cups and by Gavlak in U.S. Pat. No. 2,081,992 in which a plurality of suctions cups hold the bathtub mat to the surface. While this invention provides acceptable slip-resistance for light shower and bath mat applications, traditional suctions cups are not sufficient to prevent slipping in high traffic areas and also result in waves forming within mats, which results in movement of the mats and a less stable and flat top surface for the mats.

As mentioned, existing approaches to reducing movement of mats include significant limitations. Further, the known approaches require additional space, components, installation effort and expense. As a result, significant improvement can still be made relative to reducing the movement of floor mats.

SUMMARY OF THE INVENTION

The object of the present invention is to utilize recessions formed on the underside of the mat to reduce movement of the mat on the intended surface, typically floors. The present invention utilizes a plurality of recessions to reduce the movement of the mat. The recessions receive a compression force upon having foot or vehicular traffic impact the mat and such compression force creates a small low pressure area or near vacuum inside the recessions being impacted against the floor. As a result, the vacuum then creates a force that acts to oppose the lateral motion of the mat that would otherwise result from the traffic.

The size and shape specifications of the recessions can be varied and they can be positioned in a variety of arrangements. The recessions can be any shape that is formed on the underside of the mat, does not extend through the top of the mat (i.e., is contained within the mat), and adjoins the floor in a continuous manner to permit the formation of a low pressure area or near vacuum. In one embodiment, the recessions are two sizes of cylinders or recessed circles, one with a width of 0.75" and a depth of 0.040" and the other with a width of 1" and a depth of 0.063". Also, in one embodiment, the recessions are positioned in straight rows along one axis with the recessions in each adjacent row along such axis offset along the perpendicular axis such that every row is identical along the parallel axes but shifted along the perpendicular axis. In one embodiment the pattern does not extend to the edge of the mat in order to prevent tearing and permit the edge of the mat to be uniformly thick. The existence of multiple sizes of recessions permits improved performance on a variety of floor surfaces since larger recessions perform better on some surfaces and smaller recessions perform better on others.

In one embodiment, the recessions are formed on a base layer of material and then the base layer of material is laminated to one or more other top layers of material. While the layers can be made from different materials, in one embodiment the base layer and any intermediate layers are sheets of rubber and the uppermost of the top layers is a union of a rubber sheet with carpet, yarn or other fabric on top. In one embodiment, a soft, low durometer rubber compound, such as LD-35, is plied to a T6 aluminum mold to form the recessions and then this base layer is laminated with one or more upper layers formed from Millennium Mat MM-170 rubber compound with the uppermost layer bonded with a yarn/carpet material. In this embodiment, after lamination of the layers, the laminated sheet is pricked to avoid the accretion of gases during the curing process. Additionally, in another embodiment, additives can be introduced to the mat to make it anti-bacterial.

One advantage of the present invention is that the mat resists slipping to a much greater extent than existing mat designs. Another advantage of the invention is that the edges of the mat are more stable and therefore it is less of a tripping hazard or obstacle than traditional mats in which the edge easily rolls up onto the mat. Another advantage is that it provides the slip-resistance features without adding any weight or installation complexity to existing mat designs. Another advantage is that the invention does not require any permanent fastening means and is therefore easy to move to different locations. Another advantage is that the recessions provide some additional cushioning effect for pedestrian and vehicular traffic. Another advantage is that the recessions' cushioning effect has an anti-fatigue effect, thereby resulting in reduced wear and tear and routine maintenance. Another advantage of the invention is that the slip-resistance is effective on a wide variety of surfaces because of the variable sized and spaced recessions.

DETAILED DESCRIPTION

Figure 1:
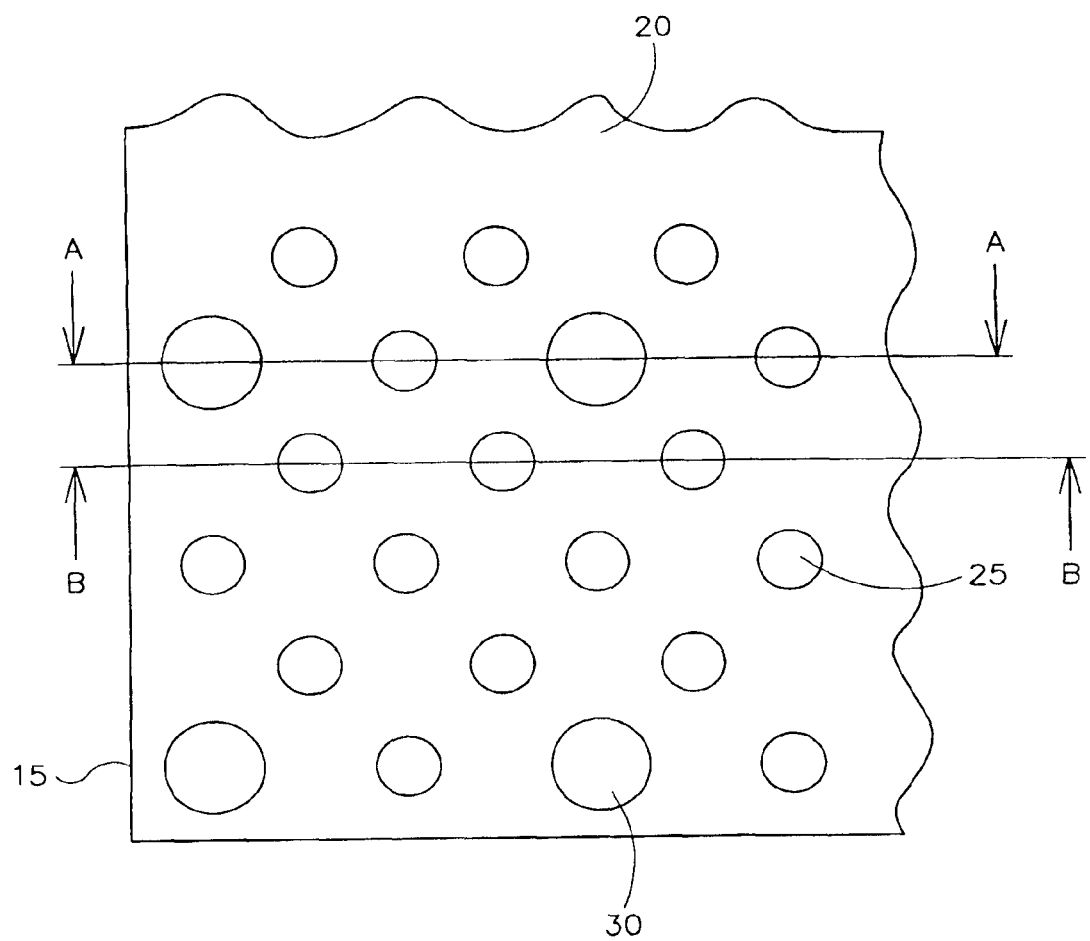
FIG. 1 is a bottom fragmentary view of one embodiment of the present invention.

FIG. 1 illustrates a portion of a mat (20) with a plurality of small recessions (25) and large recessions (30) that extend nearly to the edge of the mat (15).

Figure 2:
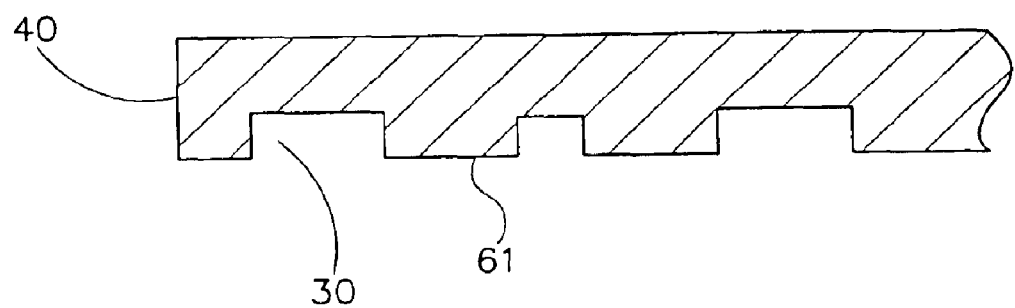
FIG. 2 is a fragmentary side elevational view of one embodiment of the present invention taken across Line A—A.

FIG. 2 illustrates a view of a cross-section of a single layer mat (20). The mat (20) has a single layer (40) which contains recessions (30) in the underside (61) of the bottom layer (40).

Figure 3:
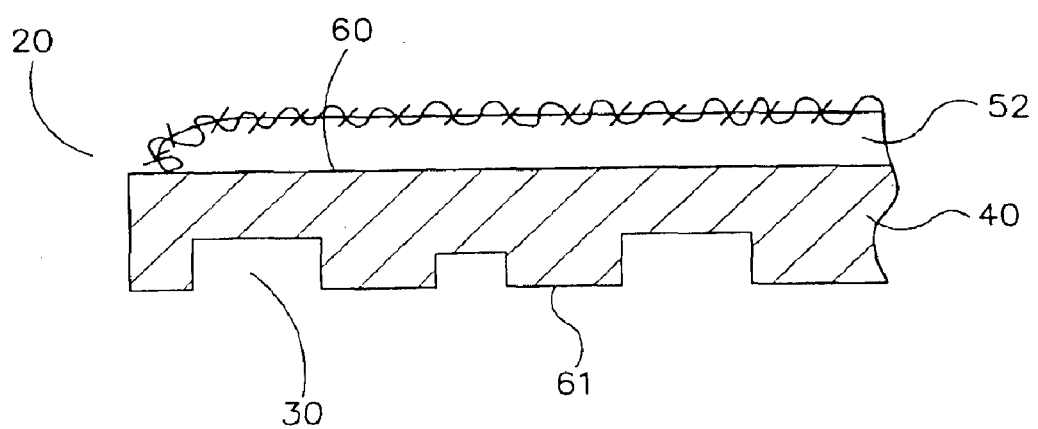
FIG. 3 is a fragmentary side elevational view of another embodiment of the present invention taken across Line A—A.

FIG. 3 illustrates a view of a cross-section of another single layer mat (20). The mat (20) has a single bottom layer (40) which contains recessions (30) in the underside (61) of the bottom layer (40). The bottom layer has a yarn, carpet or other fabric layer (52) laminated or otherwise bonded to the upper surface (60) of the bottom layer (40).

Figure 4:
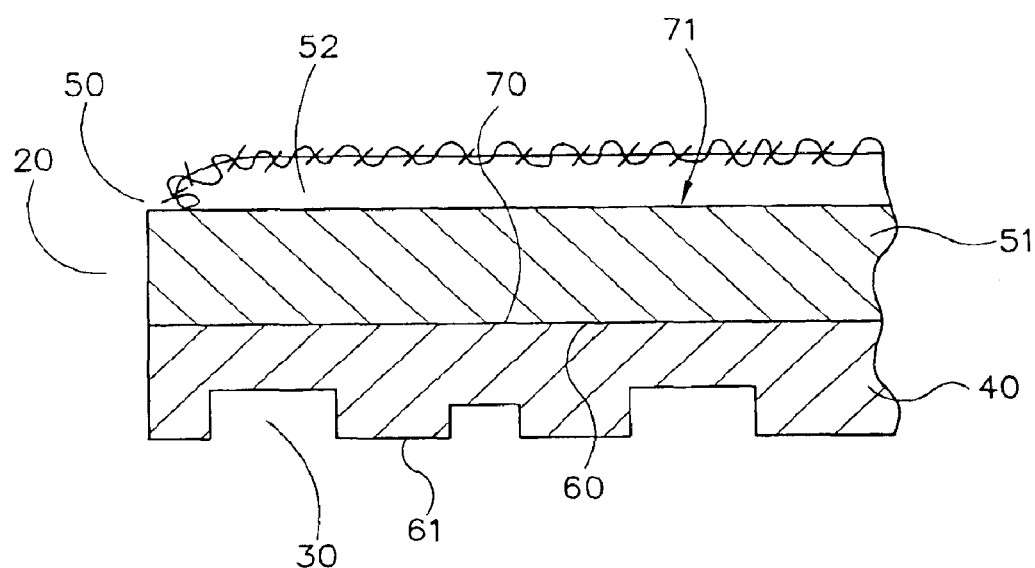
FIG. 4 is a fragmentary side elevational view of another embodiment of the present invention taken across Line A—A.

FIG. 4 illustrates a view of a cross-section of a multi-layer laminated mat (20) comprised of a bottom layer (40) and an upper layer (50). The upper surface (60) of the bottom layer (40) is laminated to or otherwise bonded with the lower surface (70) of the support layer (51) of the upper layer (50). The upper layer (50) has a yarn, carpet or other fabric layer (52) laminated or otherwise bonded on the upper surface (71) of the support layer (51). The bottom layer (40) contains recessions (30) in the underside (61) of the bottom layer (40).

Figure 5:
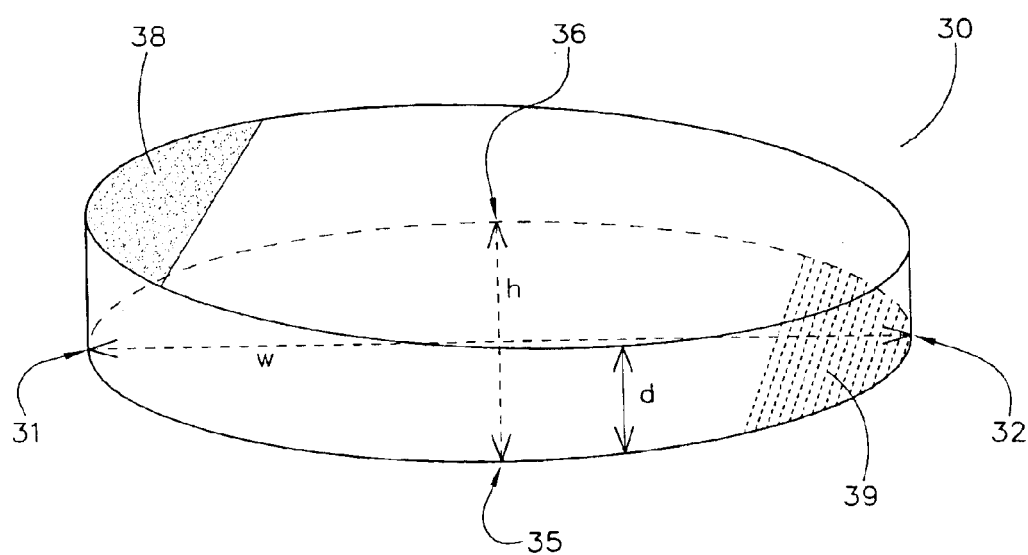
FIG. 5 is a cut-away elevational view of a single recession in one embodiment.

FIG. 5 illustrates a conceptual drawing of a single recession (30) depicted in FIGS. 1, 2, 3 and 4. The recession (30) has a width (w) running from the left edge (31) to the right edge (32), a height (h) running from the top edge (35) to the bottom edge (36), and a depth (d) running from the bottom opening (38) that would be flat against the floor to the top surface (39).

Figure 6:
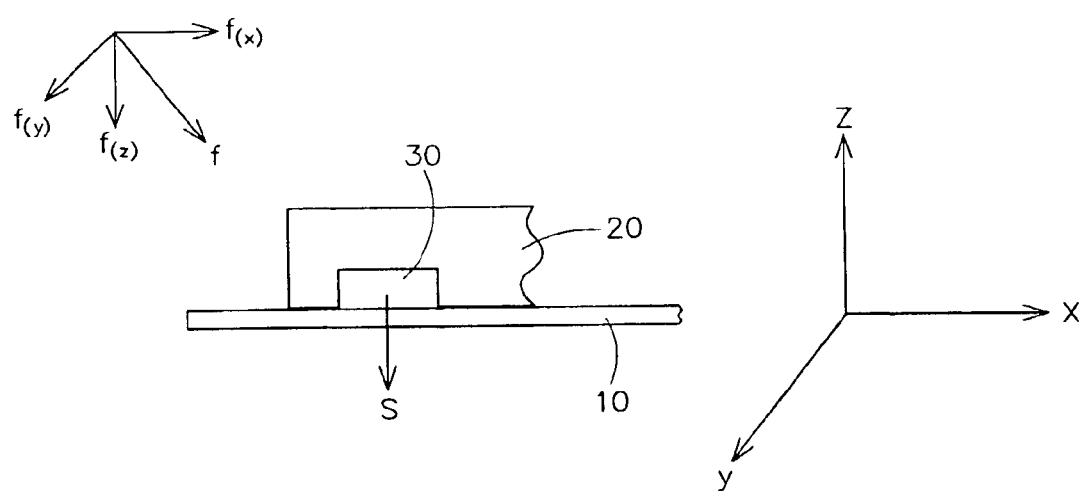
FIG. 6 is a fragmentary side elevational view of a single recession in one embodiment and the forces impacting such recession.

FIG. 6 depicts a single recession (30) in a mat (20). As foot or vehicle traffic impacts the mat (20), a force (f) is applied to the mat (20). In the vast majority of circumstances the force (f) does not impact the mat (20) in a completely vertical or horizontal manner; hence the force (f) consists of both horizontal force components (f(x) and f(y)) and a vertical force component f(z). The vertical force component f(z) acts to press the mat down against the surface (10) and holds the mat (20) against the surface (10). Additionally, the vertical force component f(z) also compresses the recession (30) thereby creating a low pressure area or near vacuum in the recession (30) between the mat (20) and the surface (10) which results in an effective resistant downward force (s) which acts in combination with the vertical force component (fy) to oppose the horizontal force components f(x) and f(y) thereby resisting lateral movement of the mat (20).

The preceding description of the invention has shown and described certain embodiments thereof; however, it is intended by way of illustration and example only and not by way of limitation. Those skilled in the art should understand that various changes, omissions and additions may be made to the invention without departing from the spirit and scope of the invention.

We claim:

1. A mat for use on a substantially flat surface comprising:
   at least one layer of material having a bottom surface and a top;
   wherein the bottom surface has at least one recession therein, the recession having an opening;
   wherein the recession is operative to reduce movement of the layer when the opening is in contact with the floor surface;
   wherein at least a portion of the recession is cylindrical;
   wherein a first recession has a width of about 0.75 inches and a depth of about 0.04 inches; and
   wherein a second recession has a width of about 1.0 inch and a depth of about 0.063 inches.

2. The mat as described in claim 1 wherein said material is rubber or plastic.

3. The mat as described in claim 1 wherein said at least one recession is located on at least one of a plurality of straight rows on said bottom surface and wherein said plurality of straight rows are parallel to each other.

4. The mat as described in claim 1 further comprising a second layer and wherein a top surface of said second layer is bonded with a third layer selected from the group consisting of yarn, carpet, and fabric.

5. The mat as described in claim 1 wherein said mat further comprises a first a second layer of said material, each layer having a top surface and a bottom surface, the top surface of said first layer being bonded to the bottom surface of said second layer.

6. The mat as described in claim 4 wherein said mat further comprises a bottom layer, wherein a top surface of the bottom layer is bonded to a bottom surface of the second layer.

7. The mat as described in claim 1 wherein said mat comprises two or more layers of material each of said layers consisting of a different material.

8. The mat as described in claim 7 wherein each of said layers consists of a different variety of rubber having varying flexibilities.

9. The mat as described in claim 6 wherein said bottom layer consists of a rubber compound having a lower durometer reading than said top layer.

10. The mat as described in claim 9 wherein said bottom layer has a durometer reading of less than 45 units and said top layer has a durometer reading of more than 75 units.

11. The mat as described in claim 9 wherein the durometer reading of said bottom layer is at least 25 durometer units less than said top layer.

12. The mat as described in claim 2 wherein said material of at least one layer is impregnated with anti-bacterial materials.

13. A process for producing a mat according to claim 5, comprising the steps of:
    supplying the first layer of material;
    press molding the first layer of material;
    supplying the second layer of material; and
    laminating said first layer and said second layer of material; and
    curing said mat.

14. The process for producing a mat according to claim 13, further comprising the step of pricking said first layer and said second layer.

15. The mat as described in claim 1 wherein a first recession has a different diameter then a second recession.

16. The mat as described in claim 3 wherein said plurality of straight rows comprise alternating rows of a first recession having a first diameter and rows of a second recession having a second diameter.

* * * * *